US010530668B2

(12) United States Patent
Ni et al.

(10) Patent No.: US 10,530,668 B2
(45) Date of Patent: Jan. 7, 2020

(54) METHOD AND ENTITIES FOR SERVICE AVAILABILITY MANAGEMENT

(71) Applicant: Huawei Technologies Co., Ltd., Shenzhen (CN)

(72) Inventors: Shaoji Ni, Helsinki (FI); Xuewen Gong, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 138 days.

(21) Appl. No.: 15/806,002

(22) Filed: Nov. 7, 2017

(65) Prior Publication Data

US 2018/0062945 A1 Mar. 1, 2018

Related U.S. Application Data

(63) Continuation of application No. PCT/EP2015/060347, filed on May 11, 2015.

(51) Int. Cl.
*G06F 15/173* (2006.01)
*H04L 12/24* (2006.01)

(52) U.S. Cl.
CPC ...... *H04L 41/5045* (2013.01); *H04L 41/5054* (2013.01)

(58) Field of Classification Search
CPC ............. H04L 41/5045; H04L 41/5012; H04L 41/5054; G06F 9/5077
See application file for complete search history.

(56) References Cited

U.S. PATENT DOCUMENTS 9,210,061 B2 * 12/2015 Richards ................. H04L 47/10
2011/0010634 A1 1/2011 Hatasaki et al.
(Continued)

FOREIGN PATENT DOCUMENTS

CN 104202264 A 12/2014
CN 104252390 A 12/2014
(Continued)

OTHER PUBLICATIONS

Foreign Communication From A Counterpart Application, Japanese Application No. 2017-555673, Japanese Decision for Grant dated Dec. 4, 2018, 1 page.
(Continued)

*Primary Examiner* — John B Walsh
(74) *Attorney, Agent, or Firm* — Conley Rose, P.C.

(57) ABSTRACT

A resource orchestration entity and a method for enabling end-to-end service reliability and availability with service flow differential deployment of a network service (NS) with one or more service flows in an NS chain comprising one or more network function nodes coupled via a plurality of intermediate networking nodes. The resource orchestration entity is arranged to obtain an information element of service availability level in at least one descriptor for defining the service availability level requirements of the service flow from an NS management entity, and provide the information element of service availability level together with an identification reference of the service flow to a resource management entity for assigning resources comprising network function nodes and their inter-connections in virtual network laying on the network hardware comprising networking nodes when instantiating the NS comprising service flows in the NS chain.

20 Claims, 3 Drawing Sheets

(56) References Cited

U.S. PATENT DOCUMENTS

| | | | |
|---|---|---|---|
| 2014/0201374 A1 | 7/2014 | Ashwood-Smith et al. | |
| 2014/0317261 A1 | 10/2014 | Shatzkamer et al. | |
| 2014/0317293 A1 | 10/2014 | Shatzkamer | |
| 2015/0109967 A1 | 4/2015 | Hogan et al. | |
| 2016/0020962 A1* | 1/2016 | Carey | H04L 41/5054 709/223 |
| 2016/0149771 A1* | 5/2016 | Prasad | H04L 41/5054 709/226 |
| 2016/0323189 A1 | 11/2016 | Ahn et al. | |
| 2017/0006116 A1* | 1/2017 | Kelly | H04L 41/04 |

FOREIGN PATENT DOCUMENTS

| | | |
|---|---|---|
| JP | 2011018198 A | 1/2011 |
| KR | 20150048652 A | 5/2015 |
| WO | 2014110453 A1 | 7/2014 |
| WO | 2015065003 A1 | 5/2015 |

OTHER PUBLICATIONS

Machine Translation and Abstract of Chinese Publication No. CN104202264, dated Dec. 10, 2014, 46 pages.

"Software Defined Availability (SDA) : Critical for Managing Datacenter Scale," Moor Insights and Strategy, Nov. 2, 2014, 9 pages.

Mihumbi, R., et al. "Network Function Virtualization: State-of-the-art and Research Challenges," XP55239665, IEEE Communications Surveys & Tutorials, Jan. 26, 2015, 287 pages.

Machine Translation and Abstract of Chinese Publication No. CN104252390, dated Dec. 31, 2014, 20 pages.

Machine Translation and Abstract of International Publication No. WO2015065003, dated May 7, 2015, 31 pages.

Foreign Communication From A Counterpart Application, Chinese Application No. 201580079807.1, Chinese Office Action dated Jun. 25, 2019, 7 pages.

Machine Translation and Abstract of Chinese Publication No. CN104202264, Dec. 10, 2014, 46 pages.

Halpern, J., Ed., et al., "Service Function Chaining (SFC) Architecture," draft-ietf-sfc-architecture-07.txt, Mar. 6, 2015, 28 pages.

Quinn, P., et al., "Network Service Header," draft-quinn-sfc-nsh-07.txt, Feb. 24, 2015, 43 pages.

Xia, F., et al., "Quality of Service Marking and Framework in Overlay Networks," draft-xia-nvo3-vxlan-qosmarking-04.txt, Mar. 5, 2015, 11 pages.

Zhang, H., et al., "Service Chain Header," draft-zhang-sfc-sch-03, Dec. 23, 2014, 17 pages.

"Network Functions Virtualisation (NFV); Architectural Framework," ETSI GS NFV 002 V1.2.1, Dec. 2014, 21 pages.

"Network Functions Virtualisation (NFV); Management and Orchestration," ETSI GS NFV-MAN 001 V1.1.1, Dec.2014, 184 pages.

"Network Functions Virtualisation (NFV); Resiliency Requirements," ETSI GS NFV-REL 001 V1.1.1, Jan. 2015, 82 pages.

"Software Defined Availability (SDA): Critical for Managing Datacenter Scale," Moor Insights and Strategy, Feb. 11, 2014, 9 pages.

Mihumbi, R., et al. "Network Function Virtualization: State-of-the-art and Research Challenges," XP55239665, IEEE Communications Surveys & Tutorials, Sep. 25, 2015, 28 pages.

Foreign Communication From a Counterpart Application, PCT Application No. PCT/EP2015/060347, English Translation of International Search Report dated Jan. 22, 2016, 6 pages.

Foreign Communication From a Counterpart Application, PCT Application No. PCT/EP2015/060347, English Translation of Written Opinion dated Jan. 22, 2016, 8 pages.

* cited by examiner

METHOD AND ENTITIES FOR SERVICE AVAILABILITY MANAGEMENT

CROSS-REFERENCE TO RELATED APPLICATIONS

This application is a continuation of International Patent Application No. PCT/EP2015/060347 filed on May 11, 2015, which is hereby incorporated by reference in its entirety.

TECHNICAL FIELD

Implementations described herein generally relate to a resource orchestration entity, and a method therein. In particular, a mechanism is herein described, for enabling end-to-end service reliability and availability with service flow differential deployment of a network service (NS) with one or more service flows in an NS chain comprising one or more network function nodes, connected via a plurality of intermediate networking nodes.

BACKGROUND

Network Functions Virtualisation (NFV) aims to transform the way that network operators architect networks by evolving standard Internet Technology (IT) virtualisation technology to consolidate many network equipment types onto industry standard high volume servers, switches and storage, which could be located in a variety of NFV infrastructure network nodes and in end-user premises.

For traditional high availability systems, such as telecom network elements, the service availability is quite difficult to operate from end-to-end. All applications or services in traditional systems are designed with the same level of service availability or resilience without any differentia. The actual "needed" availability and reliability of the services has not been considered in implementation. For example, the web browsing service, could tolerate 20-30 seconds of service interruption because of failure without impacting the user experience. However, the current system provides only one level of resilience typically with 1-10 seconds failure recovery time. Thus, over-provisioning system resource has been assigned to the service with low service availability requirement. Meanwhile, other user services may be considerably more time sensitive, for example communication by Voice over the Internet Protocol (VoIP).

One of the key design objectives in NFV has been specified as the end-to-end availability of telecommunication services. The NFV frameworks shall ensure that not all services need to be "built to the peak," but Service Level Agreements (SLAs) can be defined and applied according to given resiliency classes. The service reliability and availability requirements for a few service availability levels have been specified in NFV. The service availability level is not only given the indication of the priority of service, but also given the service recovery time requirement and priority for failure recovery.

However, there is no specified method concerning how the service reliability and availability differentia to different service types or groups is operated and managed. In addition, there is not specified how end-to-end service availability with service flow differentia is operated. Neither is there provided any mechanism for end-to-end service availability with service flow differentia management.

In some alternative solutions, a software defined availability (SDA) differentia feature has been suggested for the private cloud. However, the solution is not applicable to end-to-end service availability management and is only able to be used in the particular user case with a single application or service in a Virtual Machine (VM).

There are three problems in current system in the operation and management (O&M) of service availability.

Firstly, the conventional telecom system cannot provide service availability differentia to different service type or service group and provides only one level of service availability and reliability typically with 5-10 seconds failure recovery time. Thus, over-provisioning of the system resource has been assigned to the service with low service availability requirement.

Secondly, when mechanisms of reliability and availability have been configured and the equipment has been shipped to a service provider, the service provider cannot change the configuration of service reliability and availability.

Finally, there is no end-to-end mechanism for the operating of end-to-end service availability with service flow differentia in current system. Neither there is any provided mechanism for end-to-end service availability with service flow differentia management.

It would thus be desired to provide a mechanism for service reliability and availability differentia and operating and managing the end-to-end service reliability and availability in a flexible manner. Thereby, the service providers may be enabled to deploy the "needed" service availability and reliability to any service type or user group, dynamically.

SUMMARY

It is therefore an object to obviate at least some of the above mentioned disadvantages and to provide a mechanism for end-to-end service reliability and availability deployment with service flow differentia.

This and other objects are achieved by the features of the appended independent claims. Further implementation forms are apparent from the dependent claims, the description and the figures.

According to a first aspect, a resource orchestration entity is provided for enabling end-to-end service reliability and availability with service flow differential deployment of an NS with one or more service flows in an NS chain comprising one or more network function nodes, connected via a plurality of intermediate networking nodes. The resource orchestration entity is arranged to obtain an information element of service availability level in at least one descriptor for defining the service availability level requirements of the service flow from an NS management entity. Also, the resource orchestration entity is arranged to provide the information element of service availability level together with an identification reference of the service flow, to a resource management entity, for assigning resources comprising network function nodes and their inter-connections in Virtual Network laying on the Network hardware comprising networking nodes, when instantiating service flows in the NS chain.

Thereby, by introducing an information element defining the service availability level requirements of a service flow, a mechanism is enabled NFV management and orchestration (MANO) for assigning resources to different service flows of an NS with different service availability levels. As different NS flows are time sensitive to different extent of failure recovery, appropriate network resources could be allocated for the NS flows. Further, the entities which manage and control the assigned resources in MANO or infrastructure, when obtaining the service availability level of the service flow, can handle different service flows differently in case of an anomaly such as failure, or overload. Thereby user experience is enhanced, while the efficiency of network resource allocation is improved.

In a first possible implementation of the resource orchestration entity according to the first aspect, the resource orchestration entity is further arranged to obtain the information element of service availability level for defining the service availability level of the service flow as part of a Virtual Deployment Unit (VDU), in a Virtual Network Function Descriptor (VNFD).

Thereby a mechanism is provided for enabling resource orchestration to obtain service availability requirement given by the NS management plane to acquired logical computing or storage resources to support the service flow which have been categorised by the respective service availability levels by a service provider or similar entity.

In a second possible implementation of the resource orchestration entity according to the first aspect, or the first possible implementation of the first aspect, the obtained information element of service availability level in the VDU specifies service availability level requirements of a requested resource for the network function node.

Thereby a mechanism is provided for enabling the resource orchestration entity to request the resource management entity for assigning the computing or storage resources with an attribution of service availability level in order to support the service flows which have been categorised by the respective service availability levels by a service provider or similar entity.

In a third possible implementation of the resource orchestration entity according to the first aspect, or any of the previous implementations of the first aspect, the resource orchestration entity is arranged to obtain the information element of service availability level for defining the service availability level of the service flow embedded together with an identification reference of the service flow in a Network Forwarding Path (NFP).

Thereby a mechanism is provided, enabling resource orchestration to obtain service availability requirement given by an NS management plane to acquired logical network resources to support the service flow which have been categorised by the respective service availability levels by a service provider or similar entity.

In a fourth possible implementation of the resource orchestration entity according to the first aspect, or any of the previous implementations thereof, the obtained information element of service availability level in the NFP specifies a list of supporting service availability levels of the service flows. Further, it also describes how to identify service availability levels of the service flows. In case the service flow is identified with a transport layer identifier (ID), a corresponding mapping between service availability levels and IDs of quality of service (QoS), or class of service, is provided.

Thereby a mechanism is provided for enabling the resource orchestration entity to request the resource management entity for assigning the network resources with an attribution of service availability level in order to support the service flows which have been categorised by the respective service availability levels by a service provider or similar entity.

In a fifth possible implementation of the resource orchestration entity according to the first aspect, or any of the previous implementations thereof, the resource orchestration entity is further arranged to obtain the information element of service availability level for defining the service availability level of the service flow in a Virtual Link Descriptor (VLD).

Thereby a mechanism is provided, enabling resource orchestration to obtain service availability requirement given by the NS management plane to acquired logical network resources to support the service flow which have been categorised by the respective service availability levels by a service provider or similar entity.

In a sixth possible implementation of the resource orchestration entity according to the first aspect, or any of the previous possible implementations thereof, the obtained information element of service availability level in the VLD specifies a list of supporting service availability levels of the service flows. Further it describes how to identify service availability levels of the service flows. In case the service flow is identified with a transport layer ID, a corresponding mapping between service availability levels and IDs of QoS, or class of service is provided.

Thereby a mechanism is provided for enabling the resource orchestration entity to request the resource management entity for assigning the network resources with an attribution of service availability level able to support the service flows which have been categorised by the respective service availability levels by a service provider or similar entity.

In a seventh possible implementation of the resource orchestration entity according to the first aspect, or any of the previous possible implementations, the information element of service availability level is provided to the resource management entity in a request comprising input information defining the service availability level of the service flow supported by assigned resources.

Thereby a mechanism is provided for enabling the resource orchestration entity to request the resource management entity for assigning the computing, storage or network resources with an attribution of service availability level able to support the service flows which have been categorised by the respective service availability levels by a service provider or similar entity.

In an eighth possible implementation of the resource orchestration entity according to the first aspect, or any of the previous possible implementations thereof, the resource orchestration entity is further arranged to receive coordination information from the resource management entity concerning coordination with network infrastructure entities of the virtualisation layer and network controller, for arranging the resources with the service availability as one of its attributions.

Thereby a mechanism is provided that enable the resource orchestration entity to receive coordination information from the resource management entity concerning the coordination with network infrastructure entities of the virtualisation layer and network controller for assigning the computing, or storage, or concerning network resources with an attribution of service availability level able to support the service flows which have been categorised by the respective service availability levels by a service provider or similar entity.

In a ninth possible implementation of the resource orchestration entity according to the first aspect, or any of the previous possible implementations thereof, the resource orchestration entity is further arranged to request a network function management entity to instantiate software instances in network function node to carry service flows with a level of service availability support.

Thereby a mechanism is provided, for enabling the resource orchestration entity to request the network function management entity, to instantiate software instances in the network function node to carry service flows with a level of service availability support. By performing the instantiating operation of each network function node in the Virtualised Network Function Forwarding Graph (VNFFG), the resource orchestration enables end-to-end service reliability and availability with service flow differential deployment of an NS with one or more service flows in an NS chain comprising one or more network function nodes, connected via a plurality of intermediate networking nodes.

In a tenth possible implementation of the resource orchestration entity according to the first aspect, or any of the previous possible implementations thereof, the resource orchestration entity is comprised in a Network Function Virtualisation architectural framework. Further, the resource orchestration entity is comprised in a Network Function Virtualisation Orchestrator. In addition, the network function management entity is comprised in a Virtualisation Network Function Manager. Also, the resource management entity is comprised in a Virtualisation Infrastructure Manager. Furthermore the network function node comprises a Network Function, or a Virtualised Network Function (VNF), and wherein the inter-connection of network function nodes comprised in a Virtual network laying on Network hardware, comprising networking nodes.

Thereby further implementation details are defined and specified and the mechanism is inserted in an NFV architecture framework.

In an eleventh possible implementation of the resource orchestration entity according to the first aspect, or any of the previous possible implementations thereof, the resource orchestration entity is comprised in a Network Function Virtualisation architectural framework. Further, the resource orchestration entity is comprised in a Virtualisation Network Function Manager. In addition, the network function management entity is comprised in a Virtualisation Network Function Manager. Additionally, the resource management entity is comprised in a Virtualisation Infrastructure Manager. In further addition the network function node comprises a Network Function, or a VNF. Further the inter-connection of network function nodes is comprised in a Virtual network laying on Network hardware, comprising networking nodes.

Thereby further implementation details according to an alternative implementation are defined and specified and the mechanism is inserted in a NFV architecture framework.

According to a second aspect, a method is provided. The method aims at enabling end-to-end service reliability and availability with service flow differential deployment of an NS with one or more service flows in an NS chain comprising one or more network function nodes, connected via a plurality of intermediate networking nodes. The method comprises obtaining an information element of service availability level for defining the service availability level requirements of the service flow in at least one descriptor from an NS management entity. Further the method also comprises providing the information element of service availability level together with an identification reference of the service flow, to a resource management entity, for assigning signing resources comprising network function nodes and connections in Virtual network laying on Network hardware comprising networking nodes, when instantiating service flows in the NS chain.

In a first possible implementation of the method according to the second aspect, the information element of service availability level for defining the service availability level of the service flow is obtained as part of a VDU, in a VNFD.

In a second possible implementation of the method according to the second aspect, or the first possible implementation of the second aspect, the obtained information element of service availability level in the VDU specifies service availability level requirements of a requested resource for the network function node.

In a third possible implementation of the method according to the second aspect, or any of the previous implementations of the second aspect, the information element of service availability level for defining the service availability level of the service flow is obtained embedded together with an identification reference of the service flow in an NFP.

In a fourth possible implementation of the method according to the second aspect, or any of the previous implementations thereof, the obtained information element of service availability level in the NFP specifies a list of supporting service availability levels of the service flows. Further, it also describes how to identify service availability levels of the service flows. In case the service flow is identified with a transport layer ID, a corresponding mapping between service availability levels and IDs of QoS, or class of service, is provided.

In a fifth possible implementation of the method according to the second aspect, or any of the previous implementations thereof, the information element for defining the service availability level of the service flow is obtained in a VLD.

In a sixth possible implementation of the method according to the second aspect, or any of the previous possible implementations thereof, the obtained information element of service availability level in the VLD specifies a list of supporting service availability levels of the service flows. Further it describes how to identify service availability levels of the service flows. In case the service flow is identified with a transport layer ID, a corresponding mapping between service availability levels and IDs of QoS, or class of service is provided.

In a seventh possible implementation of the method according to the second aspect, or any of the previous possible implementations, the information element of service availability level is provided to the resource management entity in a request comprising input information defining the service availability level of the service flow supported by assigned resources.

In an eighth possible implementation of the method according to the second aspect, or any of the previous possible implementations thereof, further comprising receiving coordination information from the resource management entity concerning coordination with network infrastructure entities of the virtualisation layer and network controller, for arranging the resources with the service availability as one of its attributions.

In a ninth possible implementation of the method according to the second aspect, or any of the previous possible implementations thereof, further comprising requesting a network function management entity to instantiate software instances in network function node to carry service flows with service availability support.

In a tenth possible implementation of the method according to the second aspect, or any of the previous possible implementations thereof, the resource orchestration entity is comprised in a Network Function Virtualisation architectural framework. Further, the resource orchestration entity is comprised in a Network Function Virtualisation Orchestrator. In addition, the network function management entity is comprised in a Virtualisation Network Function Manager. Also, the resource management entity is comprised in a Virtualisation Infrastructure Manager. Furthermore the network function node comprises a Network Function, or a VNF, and wherein the inter-connection of network function nodes comprised in a Virtual network laying on Network hardware, comprising networking nodes.

In an eleventh possible implementation of the method according to the second aspect, or any of the previous possible implementations thereof, the resource orchestration entity is comprised in a Network Function Virtualisation architectural framework. Further, the resource orchestration entity is comprised in a Virtualisation Network Function Manager. In addition, the network function management entity is comprised in a Virtualisation Network Function Manager. Additionally, the resource management entity is comprised in a Virtualisation Infrastructure Manager. In further addition the network function node comprises a Network Function, or a VNF. Further the inter-connection of network function nodes is comprised in a Virtual network laying on Network hardware, comprising networking nodes.

The advantages of the method according to the second aspect are the same as those for the corresponding device claims according to the first aspect.

Other objects, advantages and novel features of the described aspects will become apparent from the following detailed description.

BRIEF DESCRIPTION OF THE DRAWINGS

Various embodiments are described in more detail with reference to attached drawings, illustrating examples of embodiments of the disclosure.

DETAILED DESCRIPTION

Embodiments of the present disclosure described herein are defined as a resource orchestration entity and a method in a resource orchestration entity, which may be put into practice in the embodiments described below. These embodiments may, however, be exemplified and realised in many different forms and are not to be limited to the examples set forth herein, rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
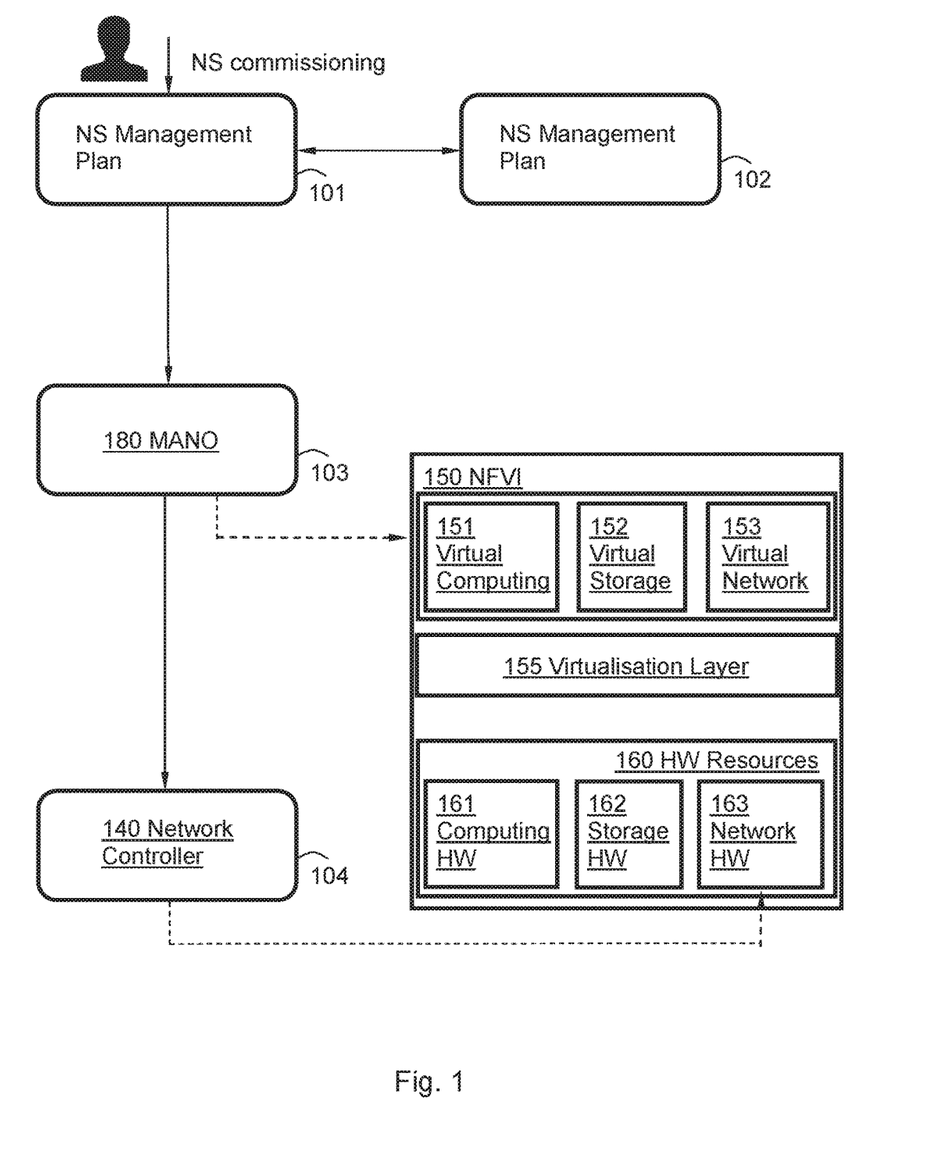
FIG. 1 is a block diagram illustrating architecture of an end-to-end service availability instantiation according to an embodiment.

FIG. 1 schematically illustrates an architecture of an end-to-end service availability instantiation, according to some embodiments.

The operation procedure for instantiating (i.e., creating) end-to-end service availability with service flow differentia of a networks service may comprise four steps in some embodiments.

In a first step 101, the NS Management Plane entity such as an Operations Support System (OSS) commissions service availability for an NS. When doing so, the NS Management Plane entity may rely on other Sub-management functionalities such as Element Management System (EMS) or Network Management System (NMS) or other O&M system for planning service availability of VNFs or Physical Network Function (PNF) together with other NS attributes including networking and generating corresponding service availability parameters and other NS deployment parameters in an NS Descriptor (NSD), VNFFG Descriptor (VNFFGD), VNFD, VDU, VLD, etc., based on the service availability levels of service flows inside the NS, in a second step 102.

Further, in a third step 103, the NS management plane may then instantiate an end-to-end service availability with service flow differentia together with NS instantiation to MANO 180. The MANO 180 may request network infrastructure element such as a Network Controller 140 for assigning resources and the needed high availability mechanisms for fulfilling the service availability requirements of this NS, in a fourth step 104. In an embodiment, the MANO 180 may request a network infrastructure element such as Network Function Virtualisation Infrastructure (NFVI) 150 comprising virtual computing 151, virtual storage 152, virtual network 153, virtualisation layer 155, and hardware resources (designated as HW Resources) 160 comprising computing hardware (designated as Computing HW) 161, storage hardware (designated as Storage HW) 162 and network hardware (designated as Network HW) 163. The NFVI 150 is the totality of all hardware and software components which build up the environment in which VNFs are deployed.

In order to be able to instantiate the service availability of the NS with service flow differentia from end-to-end, the relevant service availability information elements may be developed in any of the descriptors VDU. VLD and/or NFP of VNFFGD, according to some embodiments.

Furthermore, the NS instantiated in the VNFFG may comprise one or many service flows, each with its own SLA requirement with parameters such as QoS, co-location, physical separation, regulation constrains, service reliability and availability, security, etc. One service flow may comprise a type of service such as voice call service or gaming service etc. Further one service flow may comprise one group of users, such as premium service level users, normal service level users etc. In addition one service flow may comprise a specified service such as one machine-to-machine (M-to-M) service, or a combination of these and/or similar definitions of the service flow.

The VNFFG is the topology of the NS or a portion of the NS comprising a set of VNFs and virtual links connected between VNFs. Since the VNFFG comprises various equipment and entities produced by multiple vendors, having applied different respective proprietary solutions, it would be an advantage to have a protocol which may be used for instantiating the end-to-end service availability with service flow differentia for the NS Chaining (NSC), as a VNF might be supported by multiple venders' layer software, i.e., VNF software, virtual layer, hardware, virtual network, etc. Each Network Function or Service Function (SF) such as e.g. VNF or PNF and SF Forwarding (SFF) may be required to handle traffic with the same predefined policy during anomaly situations such as failure, or overload.

In some embodiments, the mechanisms of delivering service availability metadata for an NS from end-to-end are invented according to how the NS metadata is represented in virtual links. It is designed the parameter of Service Availability Level to be embedded into the traffic packets implicitly or explicitly according to the ways for identifying an NSC in virtual links.

An NS with end-to-end service reliability and availability with service flow differentia deployment may be enabled by introducing an information element of service availability level in a descriptor, where the service availability level of the service flow may be declared, and by providing the information element of the descriptor to network function nodes and networking nodes in the NS chain of the service flow.

Thereby a mechanism is provided for enabling a service provider or similar entity to determine different service availability levels to different service flows.

Figure 2:
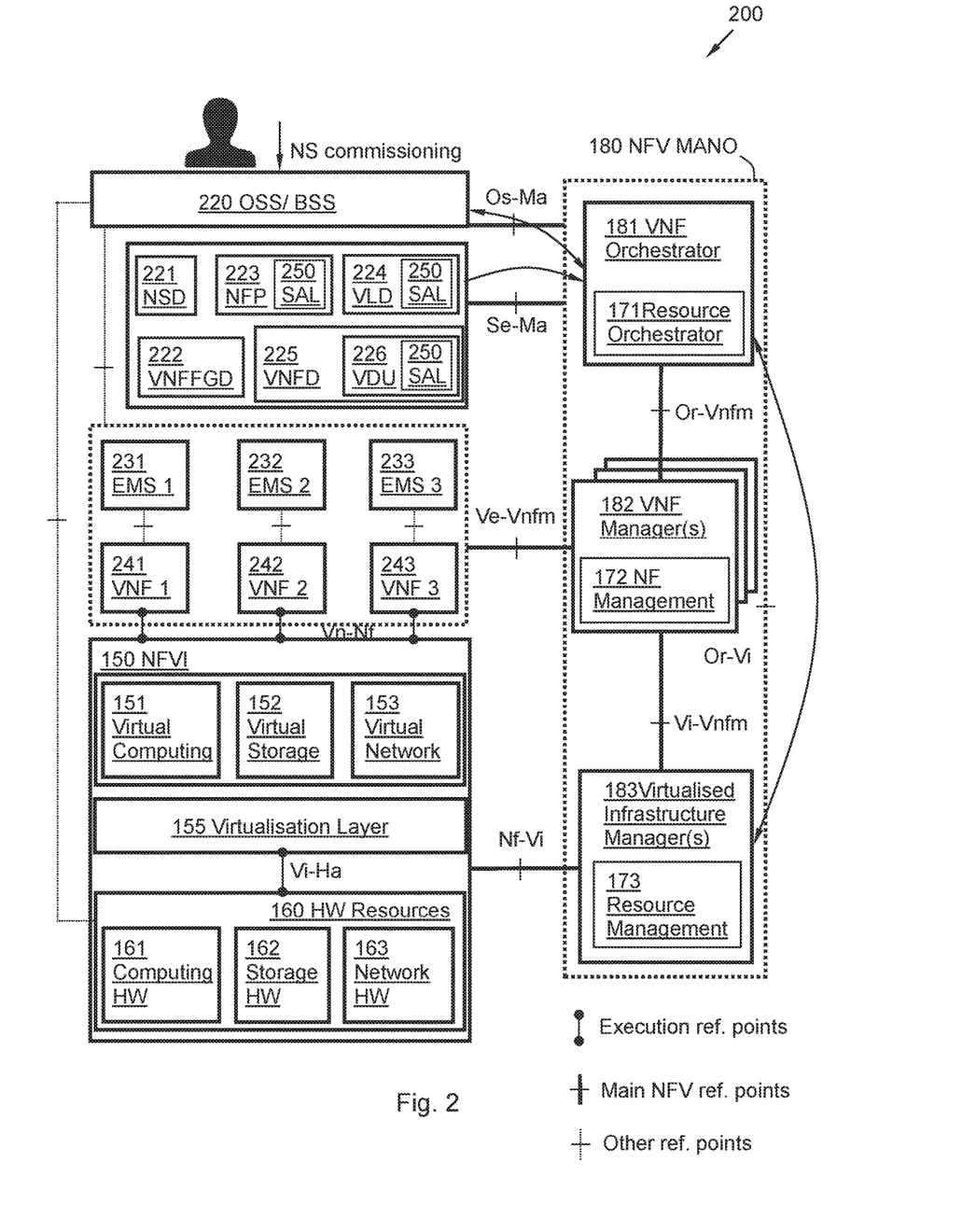
FIG. 2 is a block diagram illustrating a NFV reference architectural framework according to some embodiments.

FIG. 2 is a schematic illustration over an NFV reference architectural framework 200.

The European Telecommunications Standards Institute (ETSI) has defined the NFV architectural framework 200 depicting the functional blocks and reference points in the NFV framework as illustrated in FIG. 2. An NS can be viewed architecturally as an NS deploying and instantiating in a forwarding graph of Network Functions interconnected with virtual connections by the supporting NFVI 150. The underlying network function behaviour contributes to the behaviour of the higher-level service. Hence, the NS behaviour is a combination of the behaviour of its constituent functional blocks, which may comprise individual network function, network function Sets, and/or the NFVI 150.

Network management may be provided by the Operational Support System (OSS)/Business Support System (BSS) 220.

EMS 231, 232, 233 (designated as EMS 1, EMS 2, and EMS 3, respectively) and VNF 241, 242, 243 (designated as VNF 1, VNF 2, and VNF 3, respectively) are further provided. The VNF 241, 242, 243, or SF, or network function node as it also may be referred to as, performs the actual SF treatment on the traffic flows. It may be an instance that runs on a VM. The EMS 231, 232, 233 may be management entity for one or several VNFs 241, 242, 243.

The NFVI 150 comprises virtual computing 151, virtual storage 152, virtual network 153, virtualisation layer 155, and the HW Resources 160 comprises Computing HW 161, Storage HW 162 and Network HW 163. The NFVI 150 is the totality of all hardware and software components which build up the environment in which VNFs are deployed. The NFVI 150 can span across several locations. The network providing connectivity between these locations may be regarded to be part of the NFVI 150.

The NFV MANO 180 is the collection of all functional blocks, data repositories used by these functional blocks, and reference points and interfaces through which these functional blocks exchange information for the purpose of managing and orchestrating NFVI 150 and VNFs 241, 242, 243. The NFV MANO 180 comprises VNF Orchestrator 181, VNF Manager(s) 182 and Virtualised Infrastructure Manager(s) 183. The VNF Orchestrator 181 is in charge of the orchestration and management of NFVI 150 and software resources, and realising NSs on NFVI 150. The VNF Manager 182 is responsible for VNF lifecycle management (e.g., instantiation, update, query, scaling, and/or termination). Multiple VNF Managers 182 may be deployed. Further, the VNF Manager 182 may be deployed for each VNF 241, 242, 243, or a VNF Manager 182 may serve multiple VNFs 241, 242, 243. The Virtualised Infrastructure Manager 183 is responsible for controlling and managing the NFVI compute, storage and network resources, usually within one operator's Infrastructure Domain (e.g., all resources within an NFVI-Point of Presence (NFVI-PoP), resources across multiple NFVI-POPs, or a subset of resources within an NFVI-PoP). The Virtualised Infrastructure Manager 183 may be specialised in handling a certain type of NFVI resource (e.g., compute-only, storage-only, networking-only), or may be capable of managing multiple types of NFVI resources (e.g. in NFVI-Nodes).

The VNFFG is the topology of the NS or a portion of the NS comprising a set of VNFs 241, 242, 243 and virtual links connected between VNFs 241, 242, 243.

According to some embodiments, a system method and mechanism is provided for end-to-end service availability deployment with service flow differentia. By introducing the disclosed protocol and mechanism, the end-to-end deployment of service availability with service flow differentia in NS instantiation in a NFV environment may be controlled by the service provider, or other similar entity. Thus service availability differentia to various service flows is enabled. It is thereby ensured that not all service flows are needed to be "built to the peak" in service availability and reliability, but SLAs may be defined and applied according to given service availability levels.

By the introduction of the protocol and mechanism is not only provided a method to the end user, i.e., service provider for deploying end-to-end service availability with service flow differentia in NS instantiation but also provided the SDA capability for acquiring the needed resources and high availability mechanisms to fulfil the SLA of service availability during the operation of NS.

The protocol and mechanism for end-to-end deployment of service availability with service flow differentia is realised by introducing the metadata of service availability level. The service availability level may be embedded into the network traffic packets implicitly or explicitly in existing protocols according to the ways for representing an NSC in virtual links, in different ways according to different embodiments.

In some embodiments, the elements of the VNFFG may include connections of the virtual network. The management endpoint (e.g., OSS 220) may define how an NSC is identified in network links. When Virtual Local Area Network (VLAN), Virtual Extensible LAN (VXLAN), Multi-protocol Label Switching (MPLS) or Internet Protocol (IP) is used to be identified an NS flows, the service availability levels of service flows in each link may be mapped to the Class of Service, Type of Service or QoS of a service flow depended on the transport ID of service flow.

Thus, a new interface protocol may be provided in some embodiments by introducing new service availability parameters in information elements used in NFP of NSD 221, NFP of VNFFGD 222, VLD 224, and VDU 226 of VNFD 225 for instantiating end-to-end service availability in an NS instantiation.

A resource orchestrator 171 may be arranged for enabling end-to-end service reliability and availability with service flow differentia deployment of an NS with one or more service flows in an NS chain comprising one or more VNFs 241, 242, 243, connected via a plurality of intermediate networking nodes. Further, the resource orchestrator 171 is arranged to obtain an information element of service availability level (designated as SAL) 250 in at least one NFP 223, VLD 224, and VDU 226 for defining the service availability level requirements of the service flow from the OSS/BSS 220. Also, the resource orchestrator 171 is arranged to provide the information element of SAL 250 together with an identification reference of the service flow to a resource management 173, for assigning resources 151, 152, 153 comprising VNFs 241, 242, 243 and their inter-connections in Virtual Network 153 laying on the Network HW 163 comprising networking nodes, when instantiating service flows in the NS chain.

The resource orchestrator 171 is comprised in the NFV architectural framework 200. The resource orchestrator 171 may be comprised in the VNF Orchestrator 181. A network function management (designated as NF Management) 172 may be comprised in the VNF Manager 182. However, in some embodiments, resource orchestrator 171 may be comprised in the VNF Orchestrator 181 or in the VNF Manager 182. In addition, the network function management entity may be comprised in a Virtualisation Network Function Manager. The resource management 173 may be comprised in a Virtualisation Infrastructure Manager 183, and wherein the VNFs 241, 242, 243 may comprise a Network Function, and wherein the inter-connection of VNFs 241, 242, 243 may be comprised in a Virtual network 153 laying on Network HW 163, comprising networking nodes in some embodiments.

The resource orchestrator 171 may also be arranged to obtain the information element of SAL 250 for defining the service availability level of the service flow as part of a VDU 226, in a VNFD 225.

The obtained information element of SAL 250 in the VDU 226 may specify service availability level requirements of a requested resource for the VNFs 241, 242, 243.

Table 1 illustrates added information element of VDU 226, according to an embodiment.

TABLE 1

| Name | Type | Cardinality | Description |
|---|---|---|---|
| Service availability level | leaf | 0 . . . 1 | Given the service availability level requirement for the required resources. The information field may be used to specify the service availability requirements to underneath entities or resources (e.g., VM, hypervisor, hardware). It may support multiple service availability levels by the corresponding entities. |

In this disclosure, the NS instantiated in VNFFG may be called an NS chain which comprises one or many service flows each with its own SLA requirement with parameters such as QoS, co-location, physical separation, regulation constrains, service reliability and availability, security, etc. One service flow could be a type of service such as voice call service or gaming service etc., or one group of users, such as very important people (VIP) users, or a specified service such as one M-to-M service of one tenant. These are merely some non-limiting examples.

Further, the resource orchestrator 171 may be arranged to obtain the information element of SAL 250 for defining the service availability level of the service flow embedded together with an identification reference of the service flow in an NFP 223.

The obtained information element of SAL 250 in the NFP 223 may specify a list of supporting service availability levels of the service flows in some embodiments. Further it may describe how to identify service availability levels of the service flows. Also, in case the service flow is identified with a transport layer ID, a corresponding mapping between service availability levels and IDs of QoS, or class of service, may be provided.

The NFP 223 may comprise an ordered list of Connection Points and rule related information which may enable Network Controllers to configure accordingly forwarding tables in NFVI network resources. Multiple service flows may use in the same NFP 223. In this disclosure, the provided information element of service availability level for providing the service availability level is used to describe the service availability requirements to NFP 223. The way of identifying service availability level of service flows (based on either SF chaining (SFC) or traditional transport layer flow information such as e.g., VLAN, VXLAN, MPLS, IP, etc.) is also in this information element see Table 2. Table 2 illustrates an example of a modified NFP according to some embodiments. In case of the service flow identified with the traditional transport layer ID, e.g., VLAN tag ID, or VXLAN tag ID, or MPLS tag ID, or IP address. The information field is used to specify the service availability requirements to NFP 223 which may support one or multiple service flows in order the entities of NFP 223 can handle traffic with the same predefined policy during anomaly situations (e.g., failure, or overload).

TABLE 2

| Name | Type | Cardinality | Description |
|---|---|---|---|
| service availability levels | Leaf | 0 . . . 1 | 1) Given the list of supporting service availability levels of service flows in the NFP. 2) The way of identifying service availability level of NS flows (e.g., VLAN tag ID, or VXLAN tag ID, or MPLS tag ID), or IP address) and the corresponding mapping between Class of Service or QoS and service availability level may be given. |

The resource orchestrator 171 may in some embodiments be further arranged to obtain the information element of SAL 250 for defining the service availability level of the service flow in a VLD 224.

The obtained information element of SAL 250 in the VLD 224 may in some embodiments specify a list of supporting service availability levels of the service flows. In addition it may describe how to identify service availability levels of the service flows. Further, in case the service flow is identified with a transport layer ID, a corresponding mapping between service availability levels and IDs of QoS, or class of service may be provided.

In additional to service availability description in NFP 223, the corresponding service availability description may also be provided in a VLD 224. For one or multiple service flows supported in a virtual link, the provided information element of service availability level may be utilised to describe the service availability requirements to VLD 224, see Table 3. Table 3 discloses an added information element of the VLD 224, according to an embodiment. The way of identifying the service availability levels of different service flows may be provided to the network controller or networking node. i.e. SFF for having a fast recovery of the abnormality such as failure, overload, etc. In this disclosure, the following information element describing the service availability level may be the same as that of NFP 223 and may be designed to be used to describe the service availability requirement of a virtual link (possibly comprising also a VNF internal link) in the VLD 224, in some embodiments.

TABLE 3

| Name | Type | Cardinality | Description |
| --- | --- | --- | --- |
| Service availability level | leaf | 0 . . . 1 | 1) Given the list of supporting service availability level of service flows in the VLD.<br>2) The way of identifying service availability level of NS flows (e.g., VLAN tag ID, or VXLAN tag ID, or MPLS tag ID, or IP address) and the corresponding mapping between Class of Service or QoS and service availability level may be given. |

The service availability level of a running SF gives the service availability requirements to underneath entities or resources, such as a VM, a hypervisor, hardware and network. In this disclosure, the information element of service availability level in the VDU 226 may be designed to be used to specify the service availability requirement to underneath entities or resources such as e.g., VM, hypervisor, and/or hardware. The infrastructure layer may interpret the requirements and acquire a high availability mechanism to support services.

The information element of SAL 250 may alternatively be provided to the resource management 173 in a request comprising input information defining the service availability level of the service flow supported by assigned resources 151, 152, and 153.

In this disclosure, the following input information element in Table 4, describing the service availability level may be designed to be used to describe the service availability level requirement for the assigned resources, in some embodiments.

TABLE 4

| Information element | Qualifier | Cardinality | Content | Description |
| --- | --- | --- | --- | --- |
| Service availability level | M | 0 . . . 1 | ID | Given the service availability level requirement for the required resources. For the network resource, the way of identifying service availability level of NS flows e.g., VLAN tag ID, or VXLAN tag ID, or MPLS tag ID, or IP address) and the corresponding mapping between Class of Service or QoS and service availability level may be given. |

The resource orchestrator 171 may according to some embodiments also be further arranged to receive coordination information from the resource management 173, concerning coordination with NFVI 150 entities of the virtualisation layer 155 and a network controller, for arranging the resources 151, 152, and 153 with the service availability as one of its attributions.

Furthermore, the resource orchestrator 171 may further be arranged to request a network function management 172 to instantiate software instances in VNFs 241, 242, 243 to carry service flows with service availability support.

Figure 3:
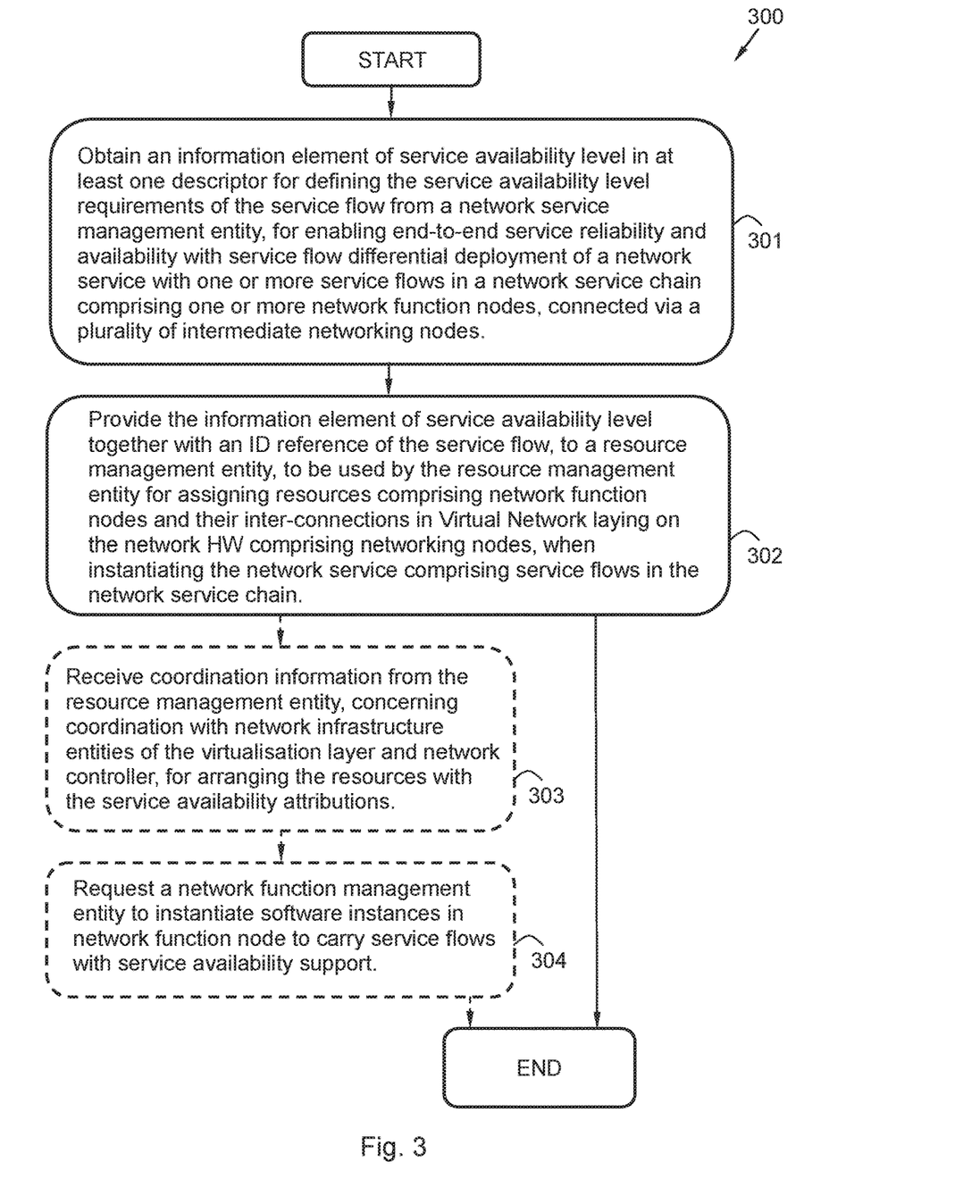
FIG. 3 is a flow chart illustrating a method according to an embodiment.

FIG. 3 is a flow chart illustrating embodiments of a method 300, for enabling end-to-end service reliability and availability with service flow differential deployment of an NS with one or more service flows in an NS chain comprising one or more network function nodes connected via a plurality of intermediate networking nodes. The method 300 may be performed entirely, or partly in a resource orchestration entity in some embodiments. However, in some embodiments, the method 300, or a part of the method 300 may be performed in another entity, such as a network function management entity, a resource management entity or other entity.

The resource orchestration entity may be comprised in an NFV architectural framework. The resource orchestration entity may be comprised in a VNF Orchestrator. The network function management entity may be comprised in a VNF Manager. However, in some embodiments, resource orchestration entity may be comprised in the VNF Orchestrator or in the VNF Manager. In addition, the network function management entity may be comprised in a VNF Manager. The resource management entity may be comprised in a Virtualisation Infrastructure Manager, and wherein the network function node may comprise a Network Function, or a VNFs, and wherein the inter-connection of network function nodes may be comprised in a virtual network laying on network hardware comprising networking nodes in some embodiments.

To appropriately enable end-to-end service reliability and availability with service flow differential deployment of an NS, the method 300 may comprise a number of steps 301-304. It is however to be noted that any, some or all of the described steps 301-304, may be performed in a somewhat different chronological order than the enumeration indicates, be performed simultaneously or even be performed in a completely reversed order according to different embodiments. Some steps such as e.g. step 303 and/or step 304 may be performed only in some embodiments of the method 300. Further, it is to be noted that some actions may be performed in a plurality of alternative manners according to different embodiments, and that some such alternative manners may be performed only within some, but not necessarily all embodiments. The method 300 may comprise the following method steps.

Step 301: Obtain an information element of service availability level in at least one descriptor for defining the service availability level requirements of the service flow from a network service management entity, for enabling end-to-end service reliability and availability with service flow differential deployment of a network service with one or more service flows in a network service chain comprising one or more network function nodes, connected via a plurality of intermediate networking nodes.

The descriptor may comprise an NFP, a VLD and/or a VDU.

The information element of service availability level for defining the service availability level of the service flow may be part of a VDU, in a VNFD in some embodiments.

The obtained information element of service availability level in the VDU may according to some embodiments specify service availability level requirements of a requested resource for the network function node.

Further in some embodiments, the information element of service availability level for defining the service availability level of the service flow may be embedded together with an identification reference of the service flow in an NFP.

The obtained information element of service availability level in the NFP may in some embodiments specify a list of supporting service availability levels of the service flows. Also, it may describe how to identify service availability levels of the service flows. In case the service flow is identified with a transport layer ID, a corresponding mapping between service availability levels and IDs of QoS, or class of service, may be provided.

According to some embodiments, the information element of service availability level for defining the service availability level of the service flow may be comprised in a VLD.

The obtained information element of service availability level in the VLD may specify a list of supporting service availability levels of the service flows in some embodiments. Further, it may describe how to identify service availability levels of the service flows. Also, in case the service flow is identified with a transport layer ID, a corresponding mapping between service availability levels and IDs of QoS, or class of service may be provided.

The information element of service availability level may be provided to the resource management entity in a request comprising input information defining the service availability level of the service flow supported by assigned resources.

Step 302: Provide the information element of service availability level together with an ID reference of the service flow, to a resource management entity, to be used by the resource management entity for assigning resources comprising network function nodes and their inter-connections in Virtual Network laying on the network HW comprising networking nodes, when instantiating the network service comprising service flows in the network service chain.

Step 303 may be performed only in some embodiments.

Step 303: Receive coordination information from the resource management entity, concerning coordination with network infrastructure entities of the virtualisation layer and network controller, for arranging the resources with the service availability attributions.

Step 304: Request a network function management entity to instantiate software instances in network function node to carry service flows with service availability support.

The above described method steps 301-304 to be performed in the resource orchestration entity together with computer program product for performing at least some of the functions of the steps 301-304. Thus a computer program comprising program code may perform a method 300 according to any, some, or all of the functions of the steps 301-304 for enabling end-to-end service reliability and availability with service flow differential deployment of an NS with one or more service flows in an NS chain comprising one or more network function nodes connected via a plurality of intermediate networking nodes.

Further, a computer program product may comprise a computer readable storage medium storing program code thereon for use by the resource orchestration entity, for obtaining an information element of service availability level in at least one descriptor for defining the service availability level requirements of the service flow from an NS management entity, and also for providing the information element of service availability level together with an identification reference of the service flow, to a resource management entity, for assigning resources comprising network function nodes and their inter-connections in virtual network laying on the network hardware comprising networking nodes, when instantiating service flows in the NS chain.

The computer program product mentioned above may be provided for instance in the form of a data carrier carrying computer program code for performing at least some of the method steps 301-304 according to some embodiments when being loaded into a computer. The data carrier may be, e.g., a hard disk, a compact disc read-only memory (CD-ROM) disc, a memory stick, an optical storage device, a magnetic storage device or any other appropriate medium such as a disk or tape that may hold machine readable data in a non-transitory manner. The computer program product may furthermore be provided as computer program code on a server and downloaded remotely, e.g., over an Internet or an intranet connection.

The terminology used in the description of the embodiments as illustrated in the accompanying drawings is not intended to be limiting of the described method 300 and entities. Various changes, substitutions and/or alterations may be made, without departing from the disclosure as defined by the appended claims. An "or" in this description and the corresponding claims is to be understood as a mathematical OR which covers both "and" and "or," and is not to be understand as an exclusive OR (XOR), unless explicitly stated.

As used herein, the term "and/or" comprises any and all combinations of one or more of the associated listed items. In addition, the singular forms "a," "an" and "the" are to be interpreted as "at least one," thus also possibly comprising a plurality of entities of the same kind, unless expressly stated otherwise. It will be further understood that the terms "includes," "comprises," "including" and/or "comprising," specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

What is claimed is:

1. A resource orchestration entity for service flow differential deployment of a network service (NS) in an NS chain, comprising:
   a memory comprising instructions; and
   a processor coupled to the memory, wherein the instructions cause the processor to be configured to:
      obtain, from a NS management entity, an information element of service availability level in at least one descriptor, wherein the information element of service availability level defines service availability level requirements of a service flow that is embedded with an identification reference of the service flow in a network forwarding path (NFP); and
      provide, to a resource management entity, the information element of service availability level when instantiating the NS, wherein the information element of service availability level enables the resource management entity to assign resources, wherein the resources assigned comprise one or more network function nodes and inter-connections of the one or more network function nodes in a virtual network, wherein the virtual network lays on network hardware comprising networking nodes, wherein the NS comprises one or more service flows in the NS chain.

2. The resource orchestration entity of claim 1, wherein the instructions further cause the processor to be configured to obtain the information element of service availability level to define the service availability level requirements of the service flow as part of a Virtual Deployment Unit (VDU) in a Virtual Network Function Descriptor (VNFD).

3. The resource orchestration entity of claim 2, wherein the information element of service availability level in the VDU specifies service availability level requirements of a requested resource for a network function node.

4. The resource orchestration entity of claim 1, wherein the information element of service availability level in the NFP is configured to:
   specify a list of supporting service availability levels of the one or more service flows;
   describe how to identify the service availability levels of the one or more service flows; and
   provide a corresponding mapping between the service availability levels and identifiers of quality of service (QoS) when the service flow is identified with a transport layer identifier.

5. The resource orchestration entity of claim 1, wherein the information element of service availability level in the NFP is configured to:
   specify a list of supporting service availability levels of the one or more service flows;
   describe how to identify the service availability levels of the one or more service flows; and
   provide a corresponding mapping between the service availability levels and identifiers of class of service when the service flow is identified with a transport layer identifier.

6. The resource orchestration entity of claim 1, wherein the instructions further cause the processor to be configured to obtain the information element of service availability level to define the service availability level requirements of the service flow in a virtual link descriptor (VLD).

7. The resource orchestration entity of claim 6, wherein the information element of service availability level in the VLD is configured to:
   specify a list of supporting service availability levels of the one or more service flows;
   describe how to identify the service availability levels of the one or more service flows; and
   provide a corresponding mapping between the service availability levels and identifiers of quality of service (QoS) when the service flow is identified with a transport layer identifier.

8. The resource orchestration entity of claim 6, wherein the information element of service availability level in the VLD is configured to:
   specify a list of supporting service availability levels of the one or more service flows;
   describe how to identify the service availability levels of the one or more service flows; and
   provide a corresponding mapping between the service availability levels and identifiers of class of service when the service flow is identified with a transport layer identifier.

9. The resource orchestration entity according to claim 1, wherein the information element of service availability level is provided to the resource management entity in a request comprising input information defining the service availability level requirements of the service flow supported by assigned resources.

10. The resource orchestration entity of claim 1, wherein the instructions further cause the processor to be configured to receive coordination information from the resource management entity that concerns coordination with network infrastructure entities of virtualisation layer and network controller to arrange the resources with the service availability level requirements as one of its attributions.

11. The resource orchestration entity of claim 1, wherein the instructions further cause the processor to be configured to request that a network function management entity instantiate software instances in a network function node so as to carry the one or more service flows with service availability support.

12. The resource orchestration entity of claim 1, wherein a network function virtualisation architectural framework comprises a virtual network function (VNF) orchestrator that comprises the resource orchestration entity, wherein a VNF manager comprises a network function management entity, wherein a virtualisation infrastructure manager comprises the resource management entity, wherein a network function node comprises a network function, and wherein the virtual network laying on the network hardware comprising the networking nodes comprise the inter-connections.

13. The resource orchestration entity of claim 1, wherein a network function virtualisation architectural framework comprises a virtual network function (VNF) orchestrator that comprises the resource orchestration entity, wherein a VNF manager comprises a network function management entity, wherein a virtualisation infrastructure manager comprises the resource management entity, wherein a network function node comprises a VNF, and wherein the virtual network laying on the network hardware comprising the networking nodes comprises the inter-connections.

14. The resource orchestration entity of claim 1, wherein a network function virtualisation architectural framework comprises a virtual network function (VNF) orchestrator that comprises the resource orchestration entity, wherein a VNF manager comprises a network function management entity, wherein a virtualisation infrastructure manager comprises the resource management entity, wherein a network function node comprises a network function, and wherein the virtual network laying on the network hardware comprising the networking nodes comprises the inter-connections.

15. The resource orchestration entity of claim 1, wherein a network function virtualisation architectural framework comprises a virtual network function (VNF) manager comprising the resource orchestration entity, wherein the VNF manager comprises a network function management entity, wherein a virtualisation infrastructure manager comprises the resource management entity, wherein a network function node comprises a VNF, and wherein the virtual network laying on the network hardware comprising the networking nodes comprises the inter-connections.

16. A method for enabling service flow differential deployment of a network service (NS) in an NS chain, wherein the method comprises:
   obtaining, from an NS management entity, an information element of service availability level in at least one descriptor, wherein the information element of service availability level defines service availability level requirements of a service flow that is embedded with an identification reference of the service flow in a network forwarding path (NFP); and
   providing, to a resource management entity, the information element of service availability level when instantiating the NS, wherein the information element of service availability level enables the resource management entity to assign resources, wherein the resources assigned comprise one or more network function nodes and connections in a virtual network, wherein the virtual network lays on network hardware comprising networking nodes, wherein the NS is deployed in a NS chain and comprises one or more service flows in the NS chain.

17. A non-transitory computer readable storage medium storing program code comprising instructions for enabling end-to-end service reliability and availability of a network service (NS) in an NS chain comprising one or more network function nodes which when executed by a processor, causes the processor to be configured to:
- obtain, from an NS management entity, an information element of service availability level to define service availability level requirements of a service flow that is embedded with an identification reference of the service flow in a network forwarding path (NFP) in at least one descriptor; and
- provide, to a resource management entity, the information element of service availability level when instantiating the NS, wherein the information element of service availability level enables the resource management entity to assign resources, wherein the resources assigned comprise one or more network function nodes and connections in a virtual network, wherein the virtual network lays on network hardware comprising networking nodes, wherein the NS is deployed in a NS chain and comprises one or more service flows in the NS chain.

18. The non-transitory computer readable storage medium of claim 17, wherein the instructions further cause the processor to be configured to obtain the information element service availability level to define the service availability level requirements of the service flow as part of a Virtual Deployment Unit (VDU) in a Virtual Network Function Descriptor (VNFD).

19. The non-transitory computer readable storage medium of claim 17, wherein the instructions to obtain the information element of service availability level in the NFP further causes the processor to be configured to:
- specify a list of supporting service availability levels of the one or more service flows;
- describe how to identify the service availability levels of the one or more service flows; and
- provide a corresponding mapping between the service availability levels and identifiers of quality of service (QoS) when the service flow is identified with a transport layer identifier.

20. The non-transitory computer readable storage medium of claim 17, wherein the instructions to obtain the information element of service availability level in the NFP further causes the processor to be configured to:
- specify a list of supporting service availability levels of the one or more service flows;
- describe how to identify the service availability levels of the one or more service flows; and
- provide a corresponding mapping between the service availability levels and identifiers of class of service when the service flow is identified with a transport layer identifier.

* * * * *